United States Patent [19]

Wiggill

[11] 3,925,996

[45] Dec. 16, 1975

[54] ROCK BOLT/ANCHORING RESIN CARTRIDGE SYSTEM

[75] Inventor: John Bentley Wiggill, Wilmington, Del.

[73] Assignee: E. I. Du Pont de Nemours & Co., Wilmington, Del.

[22] Filed: Sept. 27, 1974

[21] Appl. No.: 509,897

[52] U.S. Cl. .................................. 61/45 B; 52/698
[51] Int. Cl.² ........................................ E21D 20/02
[58] Field of Search.......... 61/45 B, 63; 117/26, 21, 117/100 C; 151/7, 145; 52/698, 704

[56] References Cited
UNITED STATES PATENTS

| | | | |
|---|---|---|---|
| 3,061,455 | 10/1962 | Anthony | 151/7 UX |
| 3,385,427 | 5/1968 | Stouls | 61/45 B X |
| 3,639,137 | 2/1972 | Marinelli | 117/26 |
| 3,699,687 | 10/1972 | Bourland | 61/45 B |
| 3,731,791 | 5/1973 | Fourcade et al. | 61/45 B |
| 3,756,388 | 9/1973 | Murphy | 61/45 B X |

*Primary Examiner*—Dennis L. Taylor

[57] ABSTRACT

A resin-anchored rock bolt system wherein a bolt-anchoring curable resin is packaged in a single-compartment film cartridge, and a component of the curing system for the resin, e.g., an initiator, a catalyst, or a promoter, is provided in the form of a coating on the surface of the bolt. The resin is cured when the coated bolt is forced through one or more of the cartridges in a drill hole and the coating is caused to admix with the resin, e.g., by rotation of the bolt.

8 Claims, No Drawings

ROCK BOLT/ANCHORING RESIN CARTRIDGE SYSTEM

BACKGROUND OF THE INVENTION

1. Field of the Invention

The present invention relates to a resin-anchored rock bolt system wherein a bolt-anchoring resin packaged in a film cartridge is cured in a drill hole by the action of a curing component initiated as a result of the bolt's penetration of the cartridge and motion therein.

2. Description of the Prior Art

In the past few years, rock bolt support systems have been developed which employ a quick-setting resin system to anchor or fix bolts in drill holes in a mine roof to give it strength and rigidity. In one such system, one or more shreddable film packages containing a polymerizable resin formulation are inserted into a drill hole, and then a bolt or reinforcing rod is pushed into the hole through the package(s). The rod or bolt tears the package(s) and, when rotated, mixes the components thereof, whereupon the resin cures and hardens, resulting in a unification of the resin, the rod or bolt, and the surrounding rock.

For resin systems which are quick-setting, e.g., on the order of a few seconds, at room temperature, it is necessary to keep certain components of the resin system separated until the time that setting is desired. The required separation heretofore generally has been achieved by the use of dual-compartment packages such as those described in U.S. Pat. No. 3,795,081. In such packages, the polymerizable resin composition is located in one compartment, and an initiator composition in the other, and the package is broken and the compositions are mixed at the time that setting is desired by the rotating action of the rock bolt thereon. When a promoter has been employed to activate the initiator, as generally is necessary in the case of resin systems whose setting is to be initiated at ambient temperature, the promoter has been located in the resin compartment and thereby also kept separated from the initiator.

Compartmentalization of the components of resin-curing systems has also been utilized in sealant coating systems on metal fastenings, e.g., rivets, by applying the components in the form of a composite coating to the faying surfaces of the fasteners, a liquid, curable sealant material being contained in pressure-rupturable capsules, and a curing agent being dispersed in a binder film in which the capsules are embedded. Such fastenings are described in U.S. Pat. No. 3,639,137.

SUMMARY OF THE INVENTION

This invention provides an improvement in a method of introducing a curable resin and a curing system therefor, e.g., a bi-component system comprising (a) an initiator or catalyst component adapted to initiate the curing of the resin and (b) a promoter component adapted to activate the initiator component, into a drill hole in a separated condition and in a manner such that the separated components are adapted to be united in the drill hole at the time of use and mixed together by the motion of a bolt therein.

The improvement of the invention comprises introducing a curing system component e.g., an initiator or promoter, into the drill hole in the form of a coating on the surface of the bolt, and the resin in a film cartridge.

The curing system can be a single-component system, i.e., one in which curing is effected by the action of a curing or cross-linking agent or hardener (or a combination of two or more such agents) such as an amine or carboxylic acid anhydride for epoxy resins; or a bi-component system, e.g., one in which curing is effected by the combined action of a catalyst or initiator component and a promoter or accelerator component, or of two initiator components of different activity. In the bi-component system, the initiator and the promoter therefor are kept separate, i.e., substantially all of the promoter used to activate the initiator employed is in the cartridge while substantially all of the initiator is in the coating, or vice versa. For greater ease in obtaining longer resin shelf life, it is preferred that the initiator be introduced separate from the resin, and therefore that the initiator be in the coating on the bolt and the promoter, if present, be in the package with the resin.

Reference herein to an initiator or promoter "component" is not to be construed as denoting that the initiator or promoter must be a single chemical compound. While a single initiator or promoter is usually sufficient, the initiator component can contain two or more compounds that initiate the curing of the resin, and the promoter component can contain two or more compounds that activate the initiator(s) employed.

A "curable resin" denotes a resin which is reactive to yield a hardened mass of higher-than-initial molecular weight.

The present invention is based on the discovery that the interaction of the initially separated resin and curing system component upon mixing does not require compartmentalization of the separated components adjacent to one another within a common package or on a common substrate. Thus, according to the present invention, separation of the resin and curing component is accomplished by the combined use of a resin package and a rock bolt.

DETAILED DESCRIPTION

In the present process, the resin is packed in a single-compartment shreddable film cartridge of suitable design, e.g., the "chub" design described in U.S.. Pat. No. 2,831,302 issued Apr. 22, 1958, and assigned to Oscar Mayer & Co. Although the design or shape of the package is not critical to the present process, chub packages, i.e., end-clipped tubular film packages, or other cartridge-type (i.e., cylindrical) packages are preferred over flat packages for drill hole use because they conform to drill hole geometry and thus result in more efficient use of the resin in the drill holes.

The packaging film must be strong enough to protect the package contents under the conditions the package will encounter in use, but at the same time is sufficiently thin and frangible that it can be broken and shredded when the bolt is pushed into it and rotated therein. Any film material which affords the required properties can be employed, e.g., polyethylene, cellophane, vinyl polymers, polymeric terephthalate esters such as polyethylene terephthalate, etc. Polyethylene terephthalate film, alone or laminated with a different film such as polyethylene, is especially preferred because of its strength, inertness with respect to the package contents, and imperviousness to vapors such as those which may issue in the case of styrene-containing resin systems.

Any resin composition which is curable, and viscous enough to be retained in the drill hole under the bolt-insertion conditions employed so as to prevent substantial loss after package rupture and before curing, can be used in the present process. Preferably, the resin is one which begins to set at ambient-temperature so as to avoid the need for supplying heat to the drill hole. Suitable resins include epoxy resins and the thixotropic unsaturated polymerizable polyester resins which are mixed with a monomeric cross-linking agent such as a polymerizable ethylenic compound. The latter resins may contain such ingredients as a stabilizer or inhibitor e.g., a quinone or phenolic inhibitor, and a promoter. A promoter may be employed to activate the catalyst used in the system, and an inhibitor to provide longer shelf life, especially if a promoter is present. Suitable resin compositions are described more fully in U.S. Pat. No. 3,302,410, the disclosure of which is incorporated herein by reference. The polyester resins are preferred owing to their ease of adaptability to packaging and storage, and to loading and curing in drill holes.

Curing systems for the preferred ambient-temperature-setting polyester resins comprise an initiator or catalyst which is adapted to initiate the curing of the resin, e.g., a peroxide type of initiator, and a promoter for the initiator. In a preferred embodiment, the initiator or catalyst is kept separated from the resin prior to use by virtue of being present in the form of a coating on the rock bolt surface. The initiator also is kept separated from the promoter, and therefore the promoter is in the resin cartridge when the initiator is in the coating.

The nature of the coating applied to the bolt depends on the properties of the curing system component to be incorporated therein (e.g., solubility, melting point, etc.), the properties of the rock bolt, and on the method by which the coating is applied. In some instances, the coating on the bolt surface will be in the form of a paste, e.g., as applied by spreading a thickened solution or a thick suspension of the curing component onto the bolt surface. In cases in which the coated bolt has to undergo a considerable degree of handling, however, it will be preferred that the coating be more firmly solidified in nature so that it maintains its adherency to the bolt's surface during normal bolt handling procedures and thus resists being removed from the surface during handling. For this reason, a solid curing component preferably is applied by a film-forming technique, e.g., dissolved in an appropriate solvent together with a binder or film-former to produce an adherent coating when applied to the surface, e.g., by spraying or dipping, or by use of an applicator. Low-melting compositions can be applied molten. In any case, the vehicle (i.e., the film-former) for the curing component should be inert thereto and soluble or dispersible in, or reactive with, the resin to permit proper contact between the resin and curing component upon mixing. Wax-like vehicles or extenders are preferred.

Initiators for unsaturated polyester resins include the conventional peroxide type of initiators, e.g., benzoyl peroxide and ketone peroxides, such as methyl ethyl ketone peroxide, and 2,4-pentanedione peroxide, and others as are described in U.S. Pat. No. 3,302,410. As is shown in the following examples, a solid peroxide, e.g., benzoyl peroxide, can be applied to the bolt by dissolving a solid mixture of the peroxide and a plasticizer, e.g., dicyclohexyl phthalate, in a volatile solvent, e.g., benzene or another aromatic hydrocarbon, and spraying the solution onto the surface of the bolt, leaving a waxy coating as the solvent evaporates. To apply 2,4-pentanedione peroxide to the bolt, for example, a solution of the peroxide, e.g., in a mixture of polar solvents, can be mixed with an extender, e.g., stearic acid, the mixture warmed until the extender dissolves, and then a thickener, e.g., fumed silica, stirred in. This mixture melts at 115°F. and can be melt-coated onto the bolt, either by dipping or spraying.

When an initiator is coated onto the bolt, a promoter for the initiator, if required, is inside the cartridge with the resin. Any of the known promoters can be used, such as those described in U.S. Pat. No. 3,302,410. Usually an aniline promoter, such as dimethylaniline, is used when benzoyl peroxide is used as the initiator. Cobalt can be used to promote ketone peroxide initiators, in which case an aniline derivative may also be incorporated in the resin to reduce the gel time.

In an alternative embodiment of the present process, promoter and initiator, or catalyst, are kept separated from one another by incorporating the promoter component of the curing system in the coating and the initiator or catalyst component in the cartridge with the resin. This embodiment preferably is used with a benzoyl peroxide or 2,4-pentanedione peroxide initiator if a resin shelf life of at least about a week is desired. Techniques for applying a promoter coating to the bolt are like those described above for applying an initiator coating. A cobalt promoter coating, for example, can be in the form of a paste (e.g., cobalt naphthenate solution thickened with fumed silica) or preferably as a firm solid as formed by a film-forming technique, e.g., applied as a melt from a mixture of cobalt naphthenate solution, paraffin, and fumed silica.

When the components of the resin-curing system are to be introduced into the drill hole, one or more cartridges containing the resin are inserted into the hole. A rock bolt coated with the curing component, e.g., an initiator (if a promoter is in the cartridge or no promoter is used) or promoter (if an initiator is in the cartridge) is forced through the cartridge(s) toward the closed end of the hole and then preferably rotated. Rotation of the bolt shreds the cartridge(s) and causes the coating on the bolt's surface to become absorbed in the resin and admixed therewith. Mixing of the resin and curing system, e.g., resin and initiator, or resin, initiator, and promoter, in this manner causes the resin to cure and harden, thereby anchoring the bolt to the rock.

The weight ratio of coating to resin can vary over a fairly wide range without a significant effect on anchoring performance, as shown in the following examples. Less coating is required when a more active initiator or a promoter is in the coating. With promoter coatings or coatings containing more active initiators such as ketone peroxides, at least about one part coating to 100 parts resin generally will be employed, at least about one part coating per 60 parts resin being preferred on the basis of more rapid curing. With initiator coatings containing benzoyl peroxide, at least about one part coating per 50 parts resin will be used, a coating/resin ratio of at least about 1/25 being preferred.

The following examples illustrate various embodiments of the present process.

EXAMPLE 1 a. A chub cartridge having a diameter of 0.875 inch (22.2 mm.) and a length of 17 inches (432 mm.), constructed of 0.0014-inch (0.036 mm)-thick polyethylene terephthalate film, and constricted and closed at each end by means of a metal clip, contains 340 grams of the following composition (by weight):

| | |
|---|---|
| Unsaturated polyester resin solution* | 28.9% |
| Cobalt naphthenate solution (6% Co) | 0.4% |
| Pulverized limestone (83% passes 325 mesh) | 70.7% |

*An inhibited reactive mixture of a resin (65.2%), prepared by reacting maleic anhydride and a saturated poly-carboxylic acid with one or more glycols, dissolved in 32% styrene monomer and containing 2.8% of N,N-dimethylaniline.

b. A solid cylindrical steel rock bolt having a nominal diameter of 0.75 inch (19.05 mm.) and a length of 27 inches (689 mm.) has applied to its surface 7 grams of a paste consisting of 83% of "Lupersol" 224 (a solution of 2,4-pentanedione peroxide available from the Lucidol Division of the Pennwalt Corp.) (4.0% active oxygen) and 17% "Cab-O-Sil" (fumed silica available from the Cabot Corp.) (weight ratio of coating to cartridge contents: 1/48). The bolt has the following surface features: (1) two vertical ribs, 180° apart, which run the full length of the bolt; (2) a series of deformations arranged in a uniform pattern on both sides of the bolt; and (3) a series of projections, or oversize lugs, spaced over the bolt surface. These features help to achieve better mixing of the resin and curing system components, and centering of the bolt in a hole.

c. A vertically mounted, schedule 80, 1-inch (25.4 mm.)-internal diameter, 2 ft. (610 mm.)-long iron pipe having a crude thread on its inside surface and one end closed by the welding of a plate thereto functions as a simulated borehole (the thread simulates the roughness of the hole). The resin cartridge described in Section (a) is inserted into the simulated borehole, and the coated rock bolt described in Section (b) is forced upward through the cartridge to the closed end of the borehole in 5 seconds and then rotated at 200 rpm for 30 seconds, whereby the initiator on the bolt surface mixes with the resin composition. The resin is well cured as evidenced by the fact that excess resin/initiator mixture (excess resin volume over the amount needed to fill the borehole containing the bolt having been provided) forced out of the bottom of the hole is gelled within 50 seconds from the start of the bolt insertion.

After 15 minutes (from the start of bolt insertion), the embedded bolt is subjected to a pull test, 1.5 (38.1 mm.) inches of the top of the simulated borehole and bolt having been sawed off to permit observation of any bolt movement. In the test, a 0–10 ton load is applied uniformly to the head of the bolt over 60 seconds, and 2 additional tons are applied uniformly each 60 seconds thereafter until the bolt breaks or pulls out to the end of the stroke (5 inches; 127 mm.) of the hydraulic jack that engages the bolt head. In this case, when the load reaches 20 tons, the bolt breaks near the head end after the other end has slipped 1.75 inches (44.4 mm.) during the pull.

EXAMPLE 2

The procedure described in Example 1 is repeated with the exception that 14 grams of the initiator paste is spread on the bolt (1/24 weight ratio of coating to cartridge contents). In this case the gel time exceeds 60 seconds. In the pull test the bolt breaks near the head at 20 tons, the other end slipping 0.687 inch (17.5 mm.).

EXAMPLE 3

The procedure described in Example 1 is repeated with the exception that the cobalt promoter is applied to the surface of the bolt, and the 2,4-pentanedione peroxide initiator replaces the cobalt naphthenate in the cartridge. The resin composition in the cartridge contains 1% of the 2,4-pentanedione peroxide solution (1/60 weight ratio of coating to cartridge contents). The shelf life of this composition is several days. The rock bolt has applied to its surface 5.8 grams of a paste consisting of 93% of "Nuodex" naphthenate, a cobalt naphthenate solution (6% cobalt) available from Tenneco Chemicals, Inc., thickened with 7% fumed silica. The resin gells with 20 seconds from the start of the bolt insertion. In the pull test, the bolt breaks at 20 tons.

EXAMPLE 4

The procedure described in Example 2 is repeated with the exception that benzoyl peroxide is substituted for the 2,4-pentanedione peroxide, and cobalt naphthenate is omitted from the resin composition. The filled resin composition in the cartridge contains 0.8% of N,N-dimethylaniline. The rock bolt has applied to its surface 14 grams of a paste consisting of 45% of BZQ-50 (a mixture of 50% benzoyl peroxide and 50% butyl benzyl phthalate, available from Witco Chemical Co.), 24% Chlorowax 500-C (chlorinated paraffin hydrocarbon, mol. wt. 415, $C_{12}$–$C_{14}$, viscosity 2000 cp, Diamond Shamrock Co.) and 31% pulverized limestone. The resin gels within 20 seconds from the start of the bolt insertion. In the pull test, the bolt pulls out at 19 tons.

EXAMPLES 5–10

In these examples, carried out according to the procedure described in Example 1, the coating applied to the bolt is in the form of a waxy solid:

| Ex. | Coating on Bolt | In Cartridge | Coating/Cartridge Wt. Ratio | Gel Time (Sec.) | Pull Test |
|---|---|---|---|---|---|
| 5 | 2,4-Pentanedione peroxide(a) | Cobalt(b) | 1/24 | 35 | Pulled — 20 tons |
| 6 | 2,4-Pentanedione peroxide(a) | Cobalt(b) | 1/45 | 50 | Pulled — 18 tons |
| | | | | 46 | Pulled — 15 tons |
| 7 | 2,4-Pentanedione peroxide(a) | Cobalt(b) | 1/100 | >95(g) | Pulled — 15 tons |
| 8 | Benzoyl peroxide(c) | Dimethylaniline(d) | 1/24 | 75(h) | Pulled — 15 tons |
| 9 | Cobalt(e) | 2,4-Pentanedione peroxide(f) | 1/45 | 60 | Pulled — 17 tons |
| 10 | Cobalt(e) | 2,4-Pentanedione | 1/100 | >95(g) | Pulled — 14 tons |

-continued

| Ex. | Coating on Bolt | In Cartridge | Coating/Cartridge Wt. Ratio | Gel Time (Sec.) | Pull Test |
|---|---|---|---|---|---|
| | | peroxide(e) | | | |

(a)67.0% peroxide soln., 27.6% stearic acid, and 5.4% fumed silica. Peroxide soln. and stearic acid heated to dissolve the latter, and silica stirred in. Melt-coated on the bolt.
(b)As in Example 1.
(c)Solid mixture of 50% benzoyl peroxide and 50% dicyclohexyl phthalate dissolved in benzene and sprayed onto bolt.
(d)As in Example 4
(e)37% cobalt naphthenate solution, 55% paraffin wax, 8% fumed silica.
(f)As in Example 3.
(g)Bolt rotated 90 sec.
(h)Bolt rotated 75 sec.

In all of the above examples, the performance of the resin-anchored bolt system, as determined by pull testing, surpasses that of mechanical bolts. In some cases (Examples 1–3), the bolt strength determines the failure point of the system. In others, the bolt pulls out generally near the bolt failure point.

I claim:

1. In a method of anchoring a rock bolt in a drill hole by introducing into the drill hole a film cartridge containing a curable resin and forcing the bolt through the cartridge in a manner such as to shred the cartridge and cause the resin to mix with a curing system therefor and thereupon to harden, the improvement comprising forcing through the cartridge in the drill hole a bolt coated with a curing system component, the motion of the bolt causing the coating to become absorbed in the resin and admixed therewith.

2. A method of claim 1 wherein said curing system comprises an initiator component adapted to initiate the curing of said resin and a promoter component adapted to activate said initiator component, and one of said components is introduced into the drill hole in the form of a coating on the surface of said bolt and the other in said film cartridge.

3. A method of claim 2 wherein the component of said curing system introduced into the drill hole in the form of a coating on the surface of said bolt is the initiator component.

4. A method of claim 2 wherein the component of said curing system introduced into the drill hole in the form of a coating on the surface of said bolt is the promoter component.

5. A method of claim 2 wherein said coating comprises said curing system component in a wax-like vehicle, said vehicle being inert with respect to said curing system component and soluble or dispersible in said resin.

6. A method of claim 5 wherein said coating is applied in the molten state to the outer surface of said bolt.

7. A method of claim 5 wherein said coating is applied to the outer surface of said bolt from solution by evaporation.

8. A method of claim 1 wherein said bolt is rotated in said resin.

* * * * *